(12) United States Patent
Suzuki

(10) Patent No.: US 6,674,597 B1
(45) Date of Patent: Jan. 6, 2004

(54) RECORDING MEDIUM STORAGE APPARATUS AND MEDIUM TRANSFER MECHANISM

(75) Inventor: Takeshi Suzuki, Yonezawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,464

(22) Filed: Mar. 15, 2000

(30) Foreign Application Priority Data

Mar. 17, 1999 (JP) .......................................... 11-072708

(51) Int. Cl.[7] ............................................. G11B 19/02
(52) U.S. Cl. ....................................................... 360/69
(58) Field of Search .............................. 360/69, 71, 85, 360/92, 98.06; 369/30.43, 30.45, 30.55, 30.57; 414/272, 273, 279, 280, 283

(56) References Cited

U.S. PATENT DOCUMENTS

| 5,253,911 A | * | 10/1993 | Egan et al. ................... 294/116 |
| 5,402,283 A | * | 3/1995 | Yamakawa et al. ............ 360/92 |
| 5,781,517 A | * | 7/1998 | Nakajima ............. 369/30.45 X |
| 6,064,544 A | * | 5/2000 | Wada ........................... 360/92 |
| 6,433,954 B1 | * | 8/2002 | Rinard et al. .................. 360/92 |

FOREIGN PATENT DOCUMENTS

| JP | 4-20654 | 2/1992 |
| JP | 4-45332 | 4/1992 |
| JP | 4-76644 | 7/1992 |

* cited by examiner

Primary Examiner—David Hudspeth
Assistant Examiner—Mitchell Slavitt
(74) Attorney, Agent, or Firm—Young & Thompson

(57) ABSTRACT

A medium transfer mechanism of a recording medium storage apparatus is provided, which is capable of reducing a load on a motor or a gear, when a recording medium is transferred. In order to store a recording medium T in libraries L1 and L2, the medium transfer mechanism of a recording medium storage apparatus includes a driving side engaging element which is moved by a motor. A follower side engaging element engages with the driving side engaging element. A predetermined gap is between the driving side engaging element and the follower side engaging element. A biasing device biases the follower side engaging element for engaging with the driving side engaging element.

9 Claims, 6 Drawing Sheets

RECORDING MEDIUM STORAGE APPARATUS AND MEDIUM TRANSFER MECHANISM

BACKGROUND OF THE INVENTION

1. Field of the Invention

The present invention relates to a recording medium storage apparatus and particularly relates to a recording medium transfer mechanism of the recording medium storage apparatus in order to transfer the recording medium to be stored in a library.

2. Background Art

In a storage apparatus for storing a recording medium such as magnetic tapes, sometimes it is necessary to transfer recording media for loading or unloading by use of a motor. FIG. 8 is a schematic representation showing a conventional medium transfer mechanism V, in which the reference letter T denotes a magnetic tape, L1 and L2 denote libraries, numeral 30 denotes a medium supporting device, and 31 denotes a motor. Here, two libraries L1 and L2 are arranged inserting the medium transfer mechanism V between two libraries.

The medium transfer mechanism V shown in FIG. 8 comprises a swivel gear 32 fixed under the medium supporting device 30, such that the medium supporting device 30 can rotate by means of a driving gear 33 attached to the motor 31. On the upper surface of the medium supporting device 30, a hand mechanism 34 for loading and unloading magnetic tapes to the libraries L1 and L2 is provided to be capable of performing reciprocating motion in the longitudinal direction of the medium supporting device 30. Owing to those components, when the medium supporting device 30 rotates, a magnetic tape supported by the hand mechanism 34 turns (swivel). In addition, an engagement of the medium supporting device 30 with the stopper portion 35 locates the rotating direction for loading and unloading to the libraries L1 and L2.

However, since the conventional medium transfer mechanism V comprises a swivel gear 32 fixed under the medium supporting device 30, a large stress to the driving gear 33 and the motor 31 results due to the impact force at the time of engagement of the medium supporting device 30 with the stopper portion 35. Thus, a problem arises in that the driving gear 33 and the motor 31 are likely to suffer damage due to the repeatedly applied stress.

SUMMARY OF THE INVENTION

It is therefore an objective of the present invention to provide a medium transfer mechanism of a medium storage apparatus, which is capable of reducing the load applied to the motor or the gear and ensuring the stable motion for a long period of time.

According to the first aspect, a medium transfer mechanism of a recording medium storage apparatus, in which the medium supporting device supporting the recording medium is transferred for storing the recording medium in a library and the medium supporting device is positioned by abutting with a stopper; comprises: a driving side engaging element which is moved by a motor; a follower side engaging element which is engaged with the driving side engaging element having a predetermined gap between said driving side engaging element; and a biasing device for biasing said follower side engaging element for engaging with said driving side engaging element.

According to the second aspect, in a medium transfer mechanism of a recording medium storage apparatus according to the first aspect, the medium transfer mechanism further comprises a control device for controlling said motor so as to stop said driving side engaging element at a predetermined location.

DETAILED DESCRIPTION OF THE INVENTION

Figure 1A:
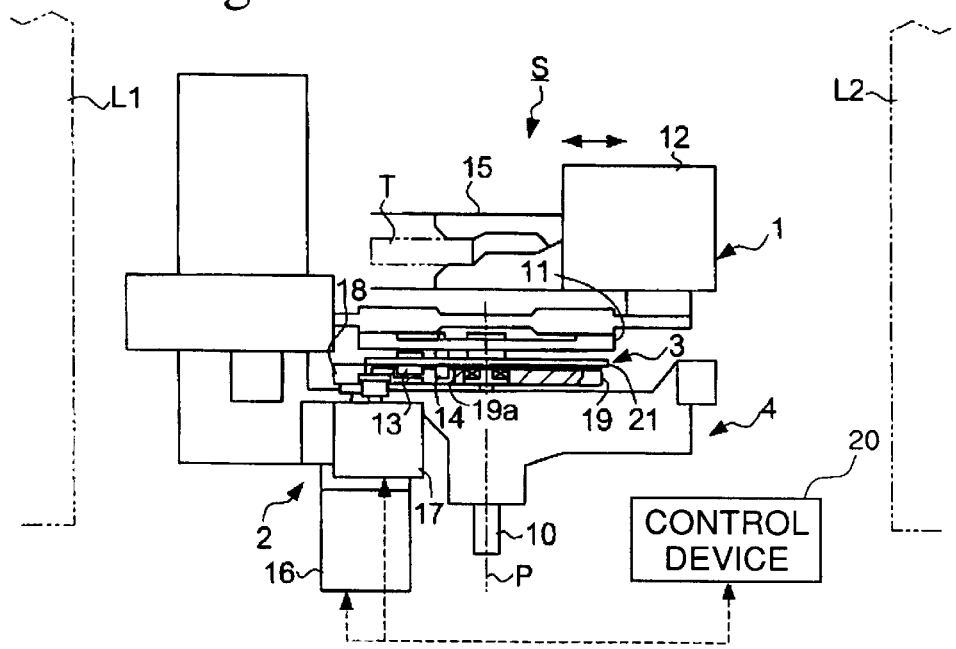
FIGS. 1A and 1B are diagrams showing schematic structures of the embodiment of the present invention.
Figure 1B:
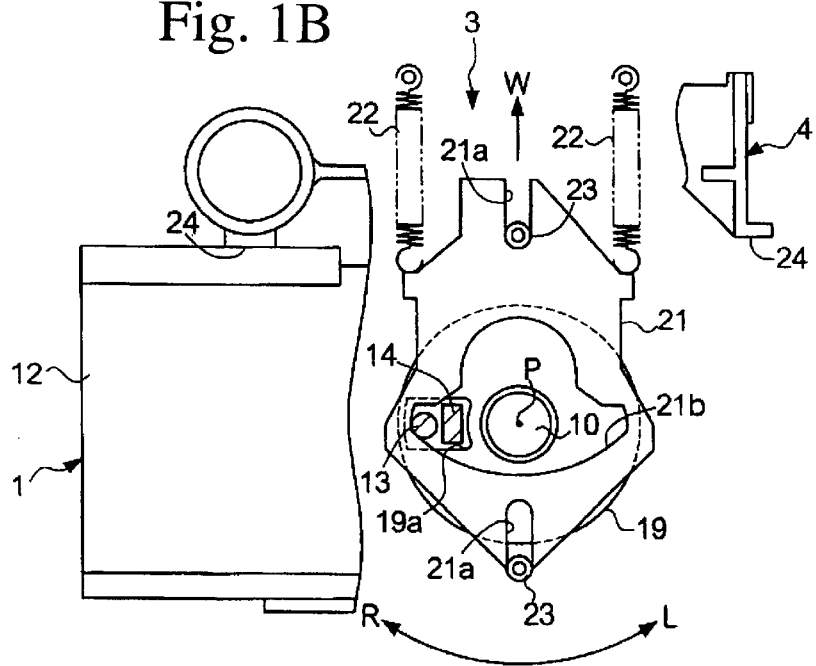

Hereinafter, an embodiment of the present invention will be described with reference to FIGS. 1 to 7. FIGS. 1A and 1B are diagrams showing schematic structures of a medium transfer mechanism S in a magnetic tape storage apparatus, wherein FIG. 1A is a side view and FIG. 1B is a plan view showing the structure of its main portion. In addition, the numeral 1 denotes a medium supporting device, 2 denotes a driving device, 3 a biasing device, and 4 a support device.

The medium supporting device 1 mainly comprises a swivel base which is fixed by fittingly inserting a swivel shaft and a hand mechanism 12 mounted on the upper surface of the swivel base 11. The swivel shaft 10 is rotatably supported by the support device 4; thereby the medium supporting device 1 as a whole is rotatable about the rotation axis p of the swivel shaft 10.

At the lower surface of the swivel base 11, the cam follower 13 fit at an eccentric position from the rotation axis p and a swivel stud 14, which is a follower side element of the engaging portion, are installed protruding downward. Furthermore, the hand mechanism 12 possesses an arm 15 capable of supporting a magnetic tape, and the arm 15 is constructed so as to carry out the reciprocation motion.

The driving device 2 comprises a driving motor 16 and an encoder 17 for detecting the rotating position of the motor 16. A driving gear 18 is installed at the output axis of the motor 16, and the driving gear 18 is formed so as to be engaged with an swivel gear 19, rotatably supported by the swivel shaft 10 at the lower side of the swivel base 11. An engaging hole 19a is formed in the swivel gear 19 constituting a driving side engaging portion, and the engaging hole 19a is formed so as to engage with the swivel stud 14 of the swivel base 11. The encoder 17 is connected with a control device 20 for controlling the motor 16 through the encoder 17.

The inner diameter of the engaging hole 19A is formed larger than that of the swivel stud 14 of the swivel base 11 so as to define a gap between the stud and the hole when engaged. In the present embodiment, the inner diameter of the engaging hole 19a is formed larger than that of the swivel stud 14 so as to allow the swivel stud 14 rotating 10 degrees about the rotation axis p in the engaging hole 19a.

The biasing device 3 comprises a detente plate 21 disposed between the swivel base 11 and the swivel gear 19, springs 22 disposed so as to pull the detente plate 21 by the spring force (biasing force) in the direction of W shown by an arrow in FIG. 1B, and a bearing 23 for guiding the movement of the detente plate 21 while inserted in a U-shaped groove 21a formed in the detente plate 21. A guide groove 21b is formed in a detente plate 21 for guiding a cam follower 13 of the swivel base 11, and the medium supporting device 1 is pulled either one of directions R or L shown by arrows in FIG. 1B, by the cam follower 13 moving along the guide groove 21b.

The support device 4 is used for positioning the medium supporting device 1 in the rotation direction to the library L1 or L2 by abutting a side surface of the hand mechanism 12 of the medium supporting device 1 to one of two stoppers 24 disposed at the respective side surfaces of the library L1 and the library L2.

Next, an operation of the medium transfer mechanism will be described with reference to FIGS. 1 to 7. Hereinafter, a case of rotating the hand mechanism 12 from the library L1 to the library L2 will be described.

Figure 2:
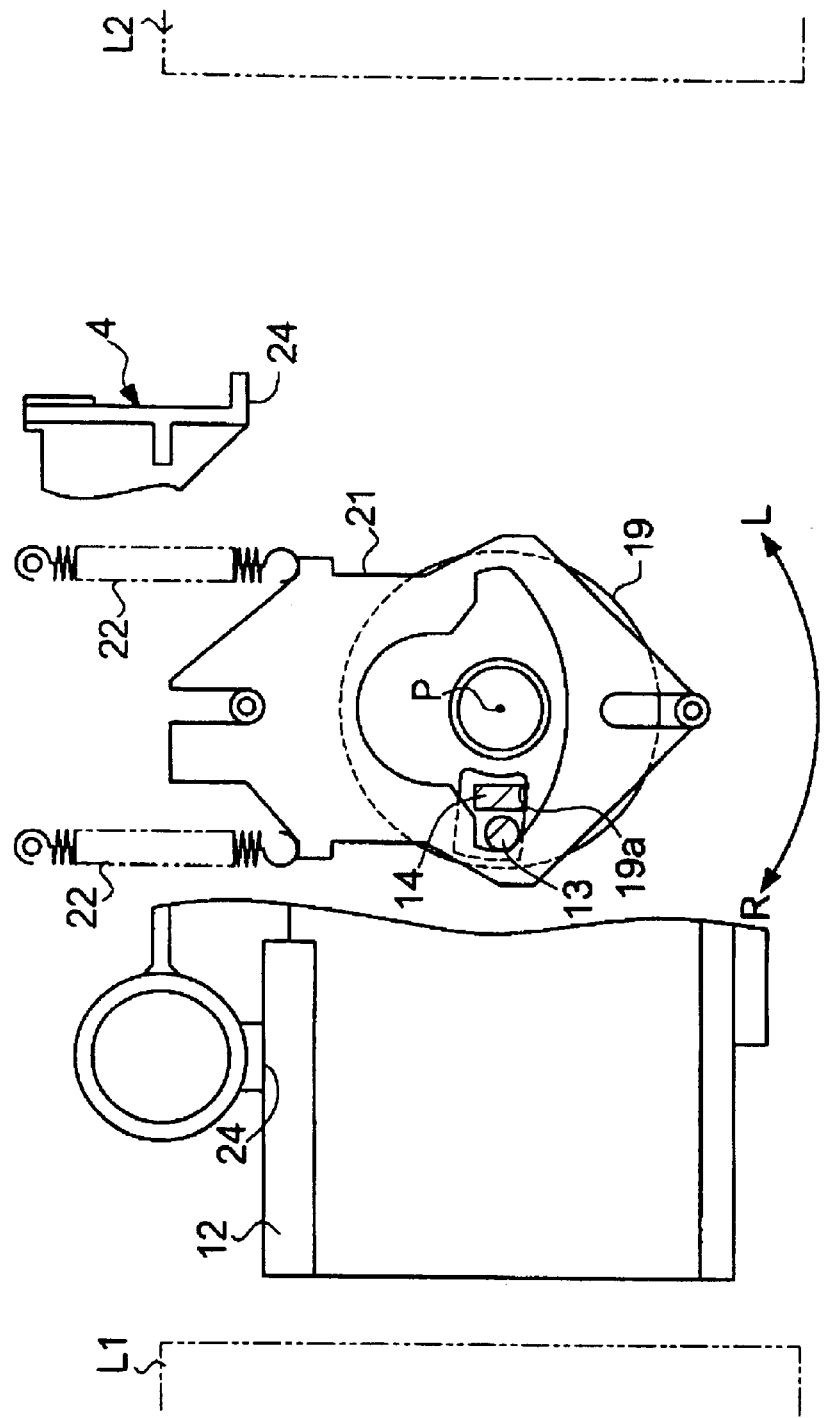
FIG. 2 is an operational diagram showing the operation of the embodiment of the present invention.

Once the power supply is activated, the control device drives the motor 16 for setting a home position for detecting the position of the hand mechanism 12. As shown in FIG. 2, the swivel gear is rotated at a low speed in the direction shown by an arrow R in the figure until the side surface of the hand mechanism 12 abuts to the stopper 24 and the engaging hole 19a of the swivel gear 19 abuts to the L side surface of the swivel stud 14. Here, the hand mechanism 12 moves together with the swivel stud 14.

Figure 3:
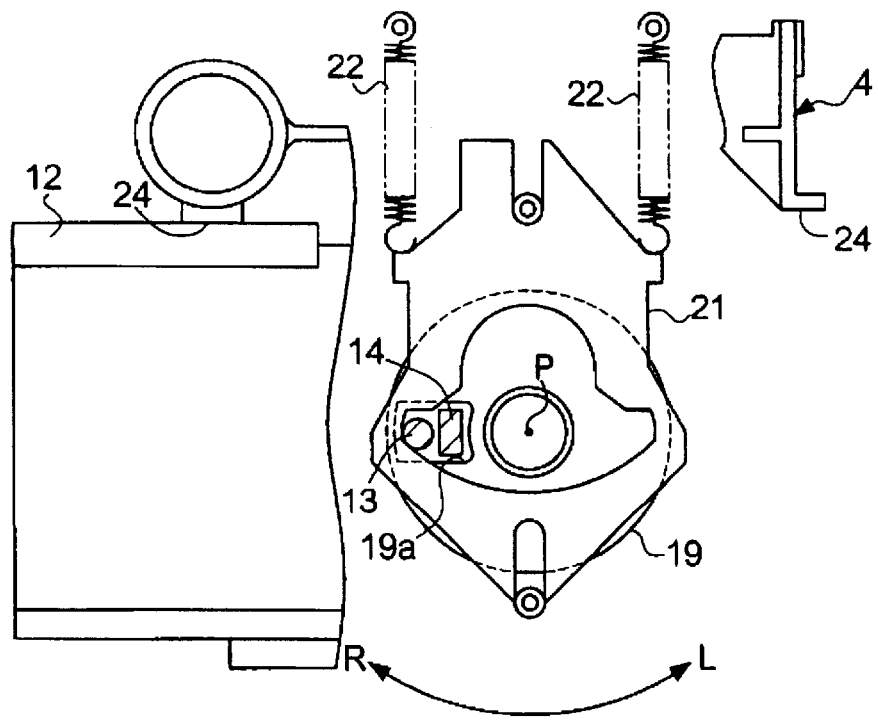
FIG. 3 is an operational diagram showing the operation of the embodiment of the present invention.
Figure 4:
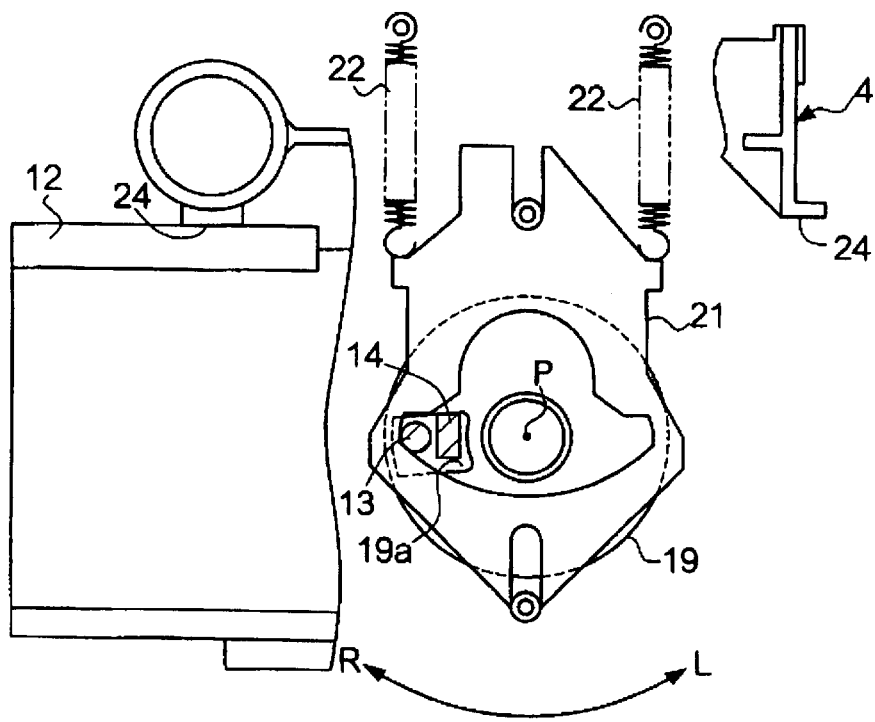
FIG. 4 is an operational diagram showing the operation of the embodiment of the present invention.

Next, the swivel gear is rotated 5 degrees from the home point toward the L side shown by the arrow. That is, as shown in FIG. 3, the side surface of the hand mechanism 12 abuts to the stopper 24 by the biasing force of the spring 22, and the engaging hole 19a and the swivel stud 14 are separated from each other. As described earlier, since the diameter of the engaging hole 19a is formed such that the swivel stud 14 can be displaced in the hole by 10 degrees, the above 5 degree rotation provides gaps corresponding to 5 degrees on both sides of the moving direction of the stud 14. This is a standby position for the hand mechanism 12 on the side of the library L1. The biasing force 22 is conducted to the swivel base 11, on which the hand mechanism 12 is loaded.

Figure 5:
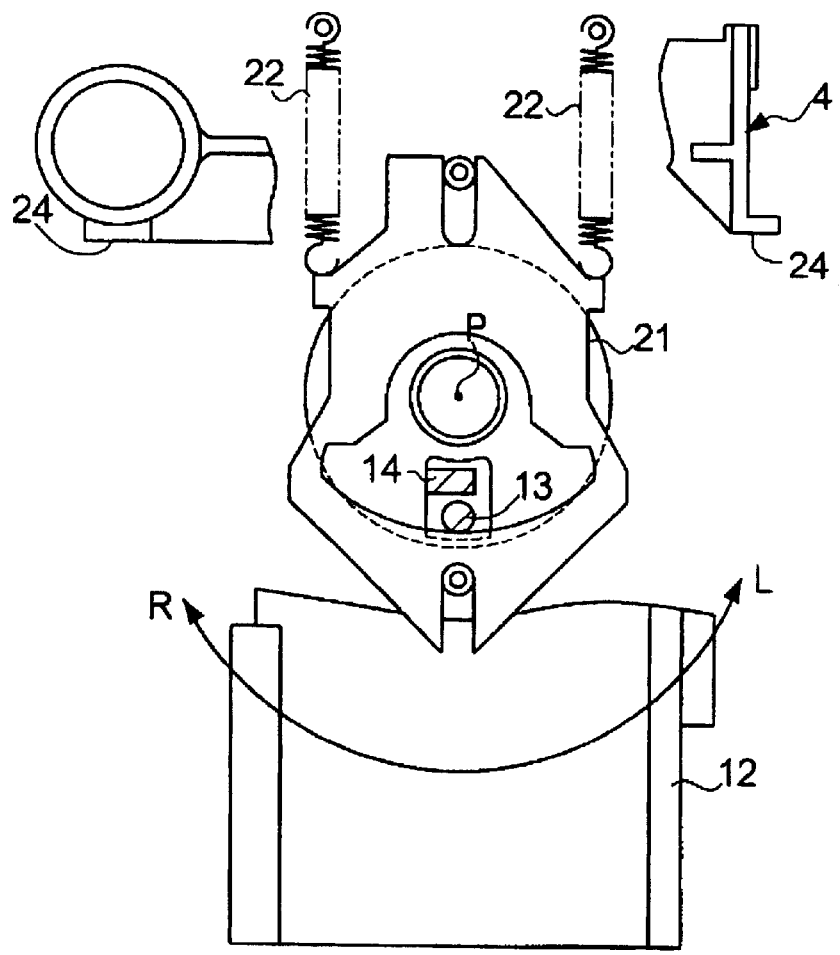
FIG. 5 is an operational diagram showing the operation of the embodiment of the present invention.
Figure 6:
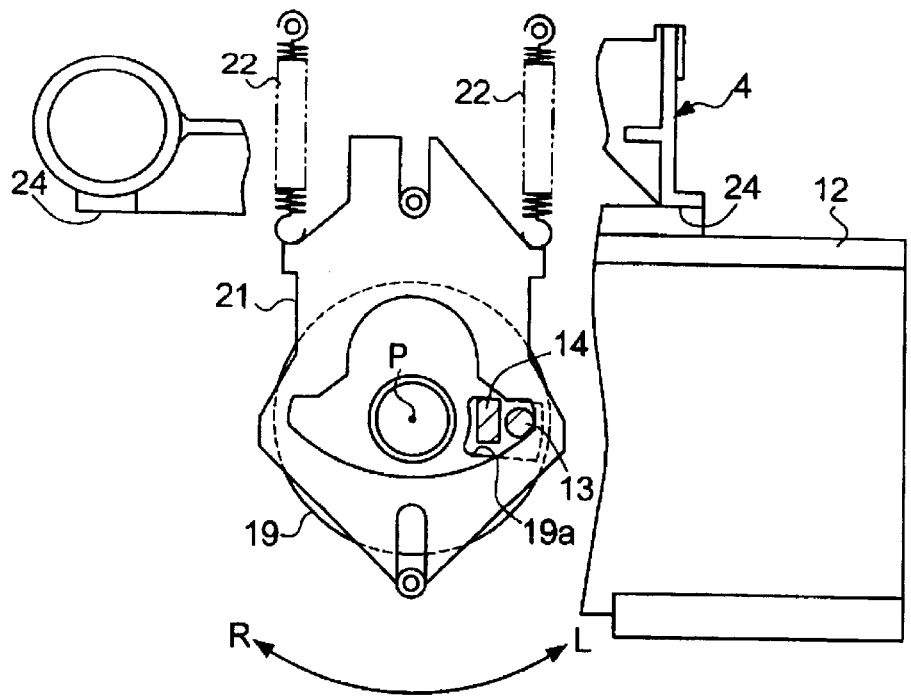
FIG. 6 is an operational diagram showing the operation of the embodiment of the present invention.
Figure 7:
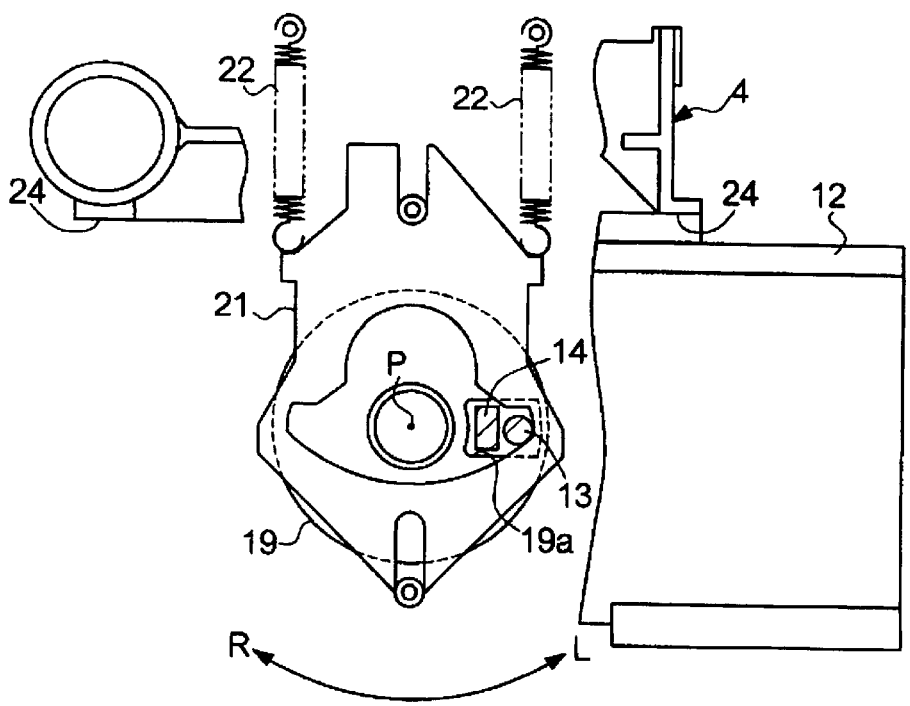
FIG. 7 is an operational diagram showing the operation of the embodiment of the present invention.
Figure 8:
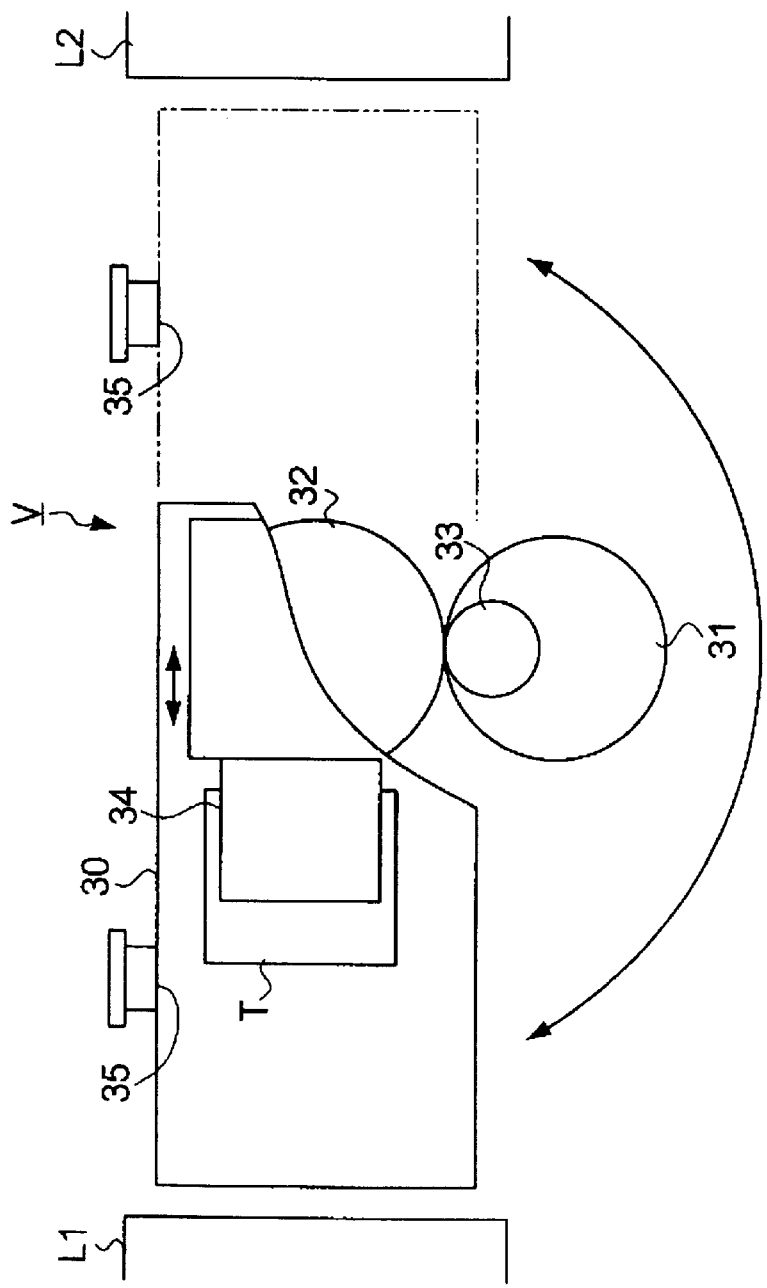
FIG. 8 is a schematic diagram showing a conventional medium transfer mechanism.

When an instruction is given to move toward the library L2, the control device 20 makes the swivel gear 19 rotate toward the arrow L. When the swivel gear 19 rotates from the ready position by 5 degrees toward the arrow L, the R side surface of the stud 14 abuts to the engaging hole 19a. Further rotating movement of the swivel gear 19 makes the detente plate slide by being pushed by the cam follower 13 opposing against the biasing force of the spring 22 (FIG. 5). The hand mechanism 12 is biased by a spring 22 in the direction toward R when located at the R side from the position shown in FIG. 5, or toward the L when located at the L side from the position of FIG. 5.

When the swivel gear 19 is rotated by 180 degrees from the home position, the hand mechanism 12 abuts to the stopper 24. At this time, since the hand mechanism 12 is biased toward the L position, the swivel stud 14 abuts to the arrow R side of the engaging hole 19a, that is, the side of the engaging hole opposite to the stopper, so that the space is generated at the arrow R side of the engaging hole. Therefore, the swivel gear 19 is further rotatable toward the L side.

The swivel gear 19 is further rotated by 5 degrees and is stopped at the position apart by 185 degrees from the home position. At this time, the same gaps corresponding to 5 degrees are formed on both side of moving directions of the swivel stud 14, and this is the standby position on the side of the library L2.

By a series of operations, the magnetic tapes T can be transferred by rotation of the hand mechanism from the library L1 to the library L2. Subsequently, a loading operation of a magnetic tape T is executed by the hand mechanism 12. The rotating operation from the library L2 to the library L1 is executed in the opposite direction from a series of the above described operations.

In the present embodiment, the swivel stud, which is the follower side element, engages with the engaging hole, which is the driving side element, while the swivel stud is pulled by the biasing force of the spring 22. Thus, the shock at the time when the hand mechanism 12 abuts to the stopper 24 acts in the direction to separate the swivel stud 14 from the engaging hole 19a. Since the size of the engaging hole is formed such that the swivel stud 14 is movable by 10 degrees, the shock at the time of abutment does not act or is not transmitted to the swivel stud 14. Thus, it is possible to reduce the load on the motor 16 and the driving gear 18.

Furthermore, in the present embodiment, since the control device 20 controls the rotation of the motor 116, it is also possible to stop in a reliable manner the hand mechanism 12 at the position where the swivel stud 14 is separated from the engaging hole 19a, after the hand mechanism 12 abuts to the stopper 24. Thereby, the load on the engaging hole 19a can be always reduced other than at the time of abutting to the stopper 24.

In the present embodiment, it is defined that the engaging hole 19a is the driving side element, and the swivel stud is the follower side element. However, the invention is not limited to the above combination, and it is possible to use other combinations if the combined elements engaging each other have a gap therebetween. For example, it is possible to adapt a rod element as a driving side element, and a hole formed in said rod element as the follower side element. In addition, the size of the gap or the clearance is not limited to the size corresponding to 10 degrees as described in the above description.

As described above, the following effects are obtained by the present invention.

Since the medium transfer mechanism of the present invention comprises a biasing device for biasing the follower side engaging element for engaging with the driving side engaging element which is moved by the motor, the shock when the medium supporting device abuts to the stopper acts to separate the driving side engaging element from the follower side engaging element. Since the driving side engaging element and the follower side engaging element engage each other with a gap therebetween, the shock at the time of abutment does not act on the driving side engaging element. Therefore, the load on the driving side motors and gears can be reduced. As a result, it is possible to enhance the durability of the motor or gears, ensuring the stable operation for a long time, and miniaturization of this mechanism is facilitated at reduced cost.

According to the second aspect, since the medium transfer mechanism further comprises a control device for controlling said motor so as to stop said driving side engaging element at a predetermined location, it is possible to further reduce the load on the motor or the gear.

What is claimed is:

1. A medium transfer mechanism of a recording medium storage apparatus, in which the medium supporting device supporting the recording medium is transferred for storing the recording medium in a library and the medium supporting device is positioned by abutting with a stopper; comprising:

a driving side engaging element which is moved by a motor;

a follower side engaging element which is engaged with the driving side engaging element and moved in rotation and having a predetermined gap between said driving side engaging element when said follower side engaging element is in a first position; and a biasing device for biasing said follower side engaging element for engaging with said driving side engaging element.

2. A medium transfer mechanism of a recording medium storage apparatus according to claim 1, wherein the medium transfer mechanism further comprises a control device for controlling said motor so as to stop said driving side engaging element at a predetermined location.

3. A recording medium transfer mechanism comprising:

a motor;

a driving element driven by said motor, said driving element having an aperture;

a medium support having a base;

a follower element connected to said base, extending into said aperture and driven in rotation by said driving element between a first position so that a gap is between said follower element and said driving element and a second position so that said follower element is contacting said driving element; and a biasing device for biasing said follower element.

4. The transfer mechanism as claimed in claim 3, further comprising a stopper, said medium support abutting said stopper to position said transfer mechanism adjacent to a library.

5. The transfer mechanism as claimed in claim 3, wherein the gap is two gaps between two sides of said follower element and two sides of the driven element that define the aperture.

6. The transfer mechanism as claimed in claim 5, wherein the two gaps are each five degrees.

7. A transfer mechanism comprising:

a motor;

a swivelable driving element driven by said motor, said driving element having an aperture;

a follower element driven in rotation by said driving element between a first position when a gap is between said follower element and said driving element and a second position when said follower element is contacting said driving element; and a biasing device for biasing said follower element.

8. The transfer mechanism as claimed in claim 7, further comprising:

a medium support connected to said driving element; and first and second stoppers, said medium support abutting one of said first and second stoppers when said driving element swivels to position said medium support adjacent respective first and second libraries.

9. The transfer mechanism as claimed in claim 8, wherein the first and second libraries are 180 degrees apart, wherein said follower element is adjacent to the first library when in said first position and is adjacent to the second library in a third position, another gap being between said follower element and said driving element in said third position, and wherein when said follower element is in said second position when the follower element is between the first and second libraries.

* * * * *